2 Sheets—Sheet 1.

C. F. T. STEINWAY,

Assignor, by mesne assignments, to himself and W. STEINWAY.

Piano-Action Frame.

No. 7,950. Reissued Nov. 13, 1877.

Witnesses.

Otto Shufeldt

Chas Stahlers

Inventor

Christian F. Theodor Steinway by

Van Santvoord & Hauff his attorneys

2 Sheets—Sheet 2

C. F. T. STEINWAY,

Assignor, by mesne assignments, to himself and W. STEINWAY.

Piano-Action Frame.

No. 7,950. Reissued Nov. 13, 1877.

Witnesses

Otto Schufeldt

Chas Wahlers

Inventor

Christian F. Theodor Steinway by

Van Santvoord & Hauff his attorneys

UNITED STATES PATENT OFFICE.

CHRISTIAN F. THEODORE STEINWAY, OF NEW YORK, N. Y., ASSIGNOR, BY MESNE ASSIGNMENTS, TO HIMSELF AND WILLIAM STEINWAY.

IMPROVEMENT IN PIANO-ACTION FRAMES.

Specification forming part of Letters Patent No. 81,306, dated August 18, 1868; Reissue No. 7,950, dated November 13, 1877; application filed October 26, 1877.

*To all whom it may concern:*

Be it known that I, C. F. THEODORE STEINWAY, of the city, county, and State of New York, have invented a new and useful Improvement in Piano-Fortes, which improvement is fully set forth in the following specification, reference being had to the accompanying drawing, in which—

Figure 1:
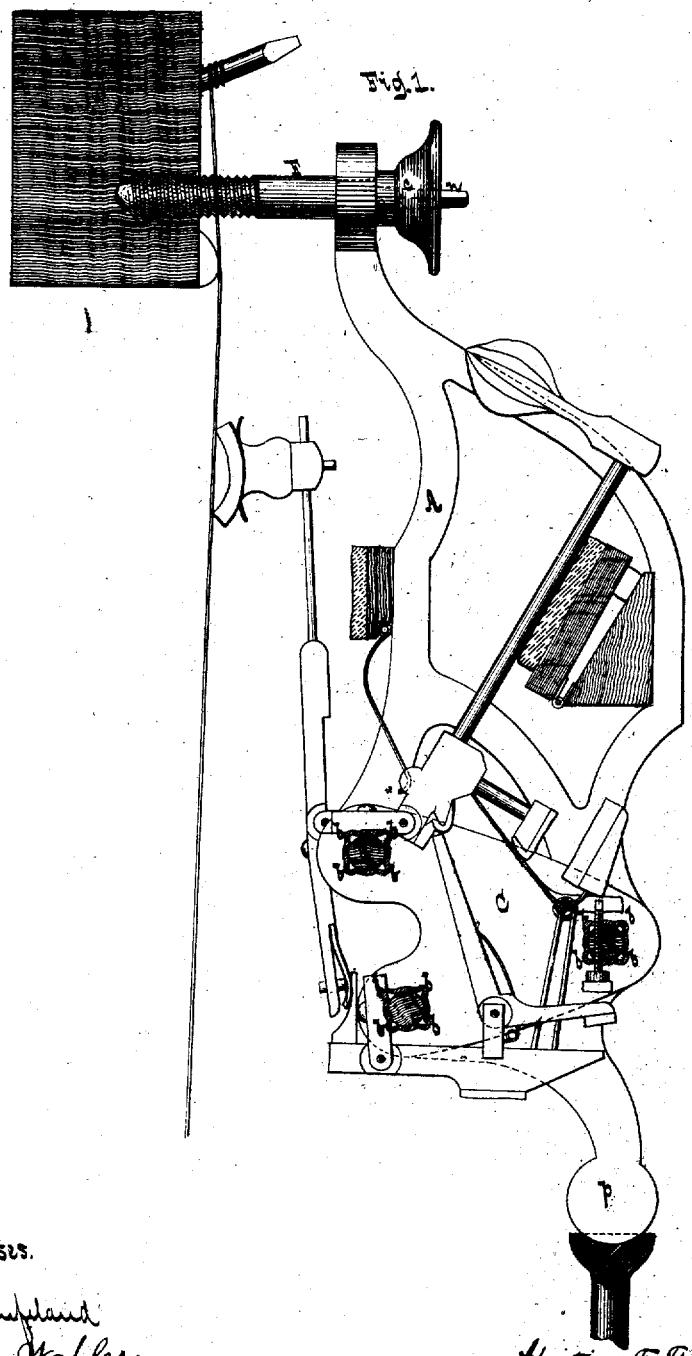
Figure 2:
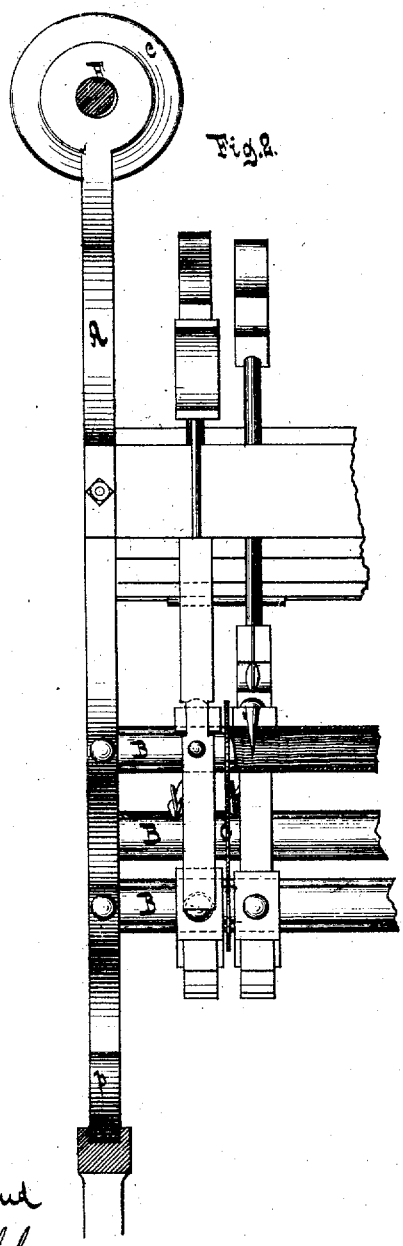
Figure 3:
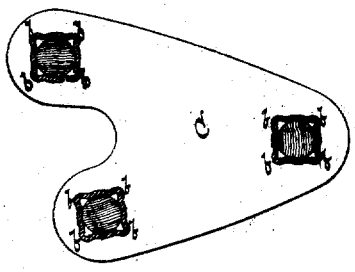

Figure 1 represents a transverse section of this invention as applied to an upright piano-forte. Fig. 2 is a rear elevation thereof, and Fig. 3 a detached face view of the intermediate supporting-plates.

Similar letters indicate corresponding parts.

This invention consists in the combination, with a piano-forte action, of a metallic frame composed of hangers or standards, and of metallic traverses which are secured to or in said hangers or standards, and which form the supports for the hammers, jacks, and other parts constituting the mechanism of the action; further, in the combination, with the action of an upright piano-forte, and with the wrest-plank thereof, of hangers secured directly to said wrest-plank, and connected together by traverses which support the various parts of the action, so that the derangement of the action due to the expansion and contraction of the wooden frame generally used for supporting the action is avoided, and a firm and unchangeable support for the several parts constituting the mechanism for the action is obtained; also, in the combination, in an action-frame, of metallic hangers or standards with flanged metallic rods or flanged tubes filled with wood, and forming traverses connecting the hangers or standards, so that a firm and unchangeable connection of said hangers or standards, and also a convenient and safe support for the various parts constituting the mechanism of the action, are obtained; further, in the combination, in a metallic action-frame for piano-fortes, of intermediate braces with the hangers or standards, and with the traverses composing said action-frame, so that the various traverses are united and made to support each other mutually, and that the strength of the frame is materially increased; also, in the combination, in a metallic action-frame, of an adjusting-screw with each of the hangers or standards of the action-frame, so that by means of said screws the position of the hammers in relation to the strings can be regulated with the greatest nicety; further, in the combination, in a metallic action-frame, of rounded segments or spheres at the ends of the hangers, with adjusting-screws acting on said hangers so that while the hangers are being adjusted by the screws their ends can roll in their steps.

In the drawings, the letter A designates one of the hangers or standards of my metallic action-frame, three or more such hangers or standards being used for each frame. These hangers or standards are connected together by traverses B, which are either made of solid wood or metal, or of tubes filled with wood, and which are fastened to or in the standards by any suitable means.

In practice I use, by preference, tubular traverses filled with wood, as shown in the drawings, since metallic tubes, when filled with wood, obtain the required stiffness, and, at the same time, common wood-screws can be used in fastening the various parts of the action to the same. When solid metal traverses are used the holes for receiving the screws have to be bored and tapped, and the screws have to be manufactured expressly for this purpose. The traverses are provided with flanges or ears *b*, which serve to retain the various parts of the action fastened to said traverses firmly in position, and prevent them from getting displaced accidentally, and, at the same time, by the flanges the stiffness and strength of the traverses are materially increased. Instead of making the traverses with flanges *b*, however, they may be made with suitable grooves, or with ribs or indentations, so as to give a firm hold to the parts fastened thereto.

The traverses are fastened in their position by intermediate plates C, which are interposed between the hangers or standards A at convenient distances apart.

By the use of my metallic action-frame the chief causes of derangement inherent to the action, particularly of upright piano-fortes, as heretofore constructed, are successfully removed.

Usually, the several parts of the action are screwed and fastened to a wooden rail from two to three inches wide, and these rails, being liable to expansion and contraction through moist and dry atmosphere, throw the parts of the action out of their proper position. Furthermore, said rails are generally fastened to wooden cheeks or frame-pieces, constituting together the so-called action-frame, and this frame is again fastened to either the key-frame or to the sides or walls of the instrument, thus creating a liability of derangement as well in the several parts of the action as in the position of the hammers to the strings.

In applying my metallic action-frame to an upright piano-forte, I secure the hangers A directly to the wrest-plank by means of screws F, which are fitted into suitable eyes of the hangers, and are clamped thereto by jam-nuts *o*. The outer ends of said screws are made square, or of such shape that they provide a hold for a wrench or key, and by releasing the jam-nuts and turning the screws F the action-frame can be adjusted closer to or farther from the wrest-plank, and the position of the hammer in relation to the strings can be accurately adjusted.

The ends *p* of the hangers opposite the screws F are made segmental or spherical, and they are intended to fit into cups or grooves in heads or screws rising from the main frame of the piano-forte, so that when the screws F are screwed in or out said segmental or spherical ends will roll in their steps and retain their position.

What I claim as new, and desire to secure by Letters Patent, is—

1. The combination, with a piano-forte action, of a metallic frame composed of hangers or standards, and of metallic traverses which are secured to or in said hangers or standards, and which form the support for the parts constituting the mechanism of the action, substantially as herein shown and described.

2. The combination, with the action of an upright piano-forte, and with the wrest-plank thereof, of hangers secured directly to the wrest-plank, and connected together by traverses which support the various parts composing the action, substantially as and for the purpose set forth.

3. The combination, in an action-frame for piano-fortes, of metallic hangers or standards with flanged metallic rods or flanged tubes filled with wood, and forming traverses connecting the hangers or standards, substantially as and for the purpose described.

4. The combination, in a metallic action-frame for piano-fortes, of intermediate braces with the hangers or standards, substantially as and for the purpose described.

5. The combination, in a metallic action-frame for piano-fortes, of an adjusting-screw with each of the hangers or standards of the action-frame, substantially as and for the purpose set forth.

6. The combination, in a metallic action-frame for upright piano-fortes, of rounded segments or spheres at the ends of the hangers with adjusting-screws acting on said hangers, substantially as and for the purpose described.

In testimony that I claim the foregoing I have hereunto set my hand and seal this 19th day of October, 1877.

C. F. THEODORE STEINWAY. [L. S.]

Witnesses:

W. HAUFF,

E. F. KASTENHUBER.